United States Patent [19]
Yang et al.

[11] Patent Number: 5,465,331
[45] Date of Patent: Nov. 7, 1995

[54] APPARATUS HAVING THREE SEPARATED AND DECENTRALIZED PROCESSORS FOR CONCURRENTLY AND INDEPENDENTLY PROCESSING PACKETS IN A COMMUNICATION NETWORK

[75] Inventors: Michael S. Yang, Katonah; Jih-Shyr Yih, Yorktown Heights, both of N.Y.

[73] Assignee: International Business Machines Corporation, Armonk, N.Y.

[21] Appl. No.: 996,384

[22] Filed: Dec. 23, 1992

[51] Int. Cl.⁶ .................... G06F 15/16; H04J 3/02
[52] U.S. Cl. ............ 395/200.08; 395/800; 395/200.01; 364/DIG. 1; 364/284.4; 364/242.4; 364/230; 370/60; 370/60.1; 370/61; 370/94.1
[58] Field of Search ................ 370/60, 61, 94.1; 395/200, 325, 800

[56] References Cited

U.S. PATENT DOCUMENTS

| | | | |
|---|---|---|---|
| 4,493,021 | 1/1985 | Agrawal et al. | 395/200 |
| 4,654,654 | 3/1987 | Butler et al. | 340/825.5 |
| 4,777,595 | 10/1988 | Strecker et al. | 395/200 |
| 4,862,454 | 8/1989 | Dias et al. | 370/94 |
| 4,890,281 | 12/1989 | Balboni et al. | 370/60 |
| 5,101,402 | 3/1992 | Chiu et al. | 370/17 |
| 5,140,582 | 8/1992 | Tsuboi et al. | 370/60 |
| 5,235,595 | 8/1993 | O'Dowd | 370/94.1 |
| 5,249,292 | 9/1993 | Chiappa | 395/650 |
| 5,303,302 | 4/1994 | Burrows | 380/49 |

OTHER PUBLICATIONS

R. Perlman et al., "Choosing the Appropriate ISO Layer for LAN Interconnection," IEE Network, vol. 2, No. 1 (Jan. 1988).

W. M. Seifert, "Bridges and Route s," IEE Network, vol. 2, No. 1, (Jan. 1988).

*Primary Examiner*—Krisna Lim
*Attorney, Agent, or Firm*—Ratner & Prestia

[57] ABSTRACT

A parallel, scalable internetworking unit (IU) architecture employing at least two network controllers (NCs), a foreground buffer controller with local memory, a background buffer controller with local memory, a node processor (NP) and a buffer memory. Each network attached to the IU has an individual network controller which communicates with the foreground buffer controller. The foreground buffer controller interfaces with NCs and maintains queueing information. The background buffer controller communicates with the foreground buffer controller for maintaining packets of data as linked lists of buffers in the buffer memory. The NP communicates with both the foreground and background buffer controllers to process stored header information. And, a connection matrix is provided to dynamically interconnect multiple IUs for increased parallel processing of packet traffic and processing.

12 Claims, 9 Drawing Sheets

PT: PACKET TYPE
TT: TRAFFIC TYPE

PS: PACKET STATE
F: FIRST BUFFER INDICATOR
X: DON'T CARE

Z: ZERO BTYE BUFFER INDICATOR

APPARATUS HAVING THREE SEPARATED AND DECENTRALIZED PROCESSORS FOR CONCURRENTLY AND INDEPENDENTLY PROCESSING PACKETS IN A COMMUNICATION NETWORK

FIELD OF THE INVENTION

The invention relates generally to an internetworking unit architecture and, more particularly, to a scalable parallel internetworking unit architecture designed to parallel process the tasks of command/data trafficking, packet processing and buffer management.

BACKGROUND OF THE INVENTION

The present invention involves the concept of networking networks, a procedure called network interconnection, or internetting.

Internetting was first explored in the early 1970's by DARPA. The agency sought ways to interconnect different packet networks so that computers using them could communicate without concern for which kind of and how many networks made the interconnections. Special processors called gateways (or internetworking units) were developed to connect two or more networks and to pass packet traffic from one network to the next.

To send the information, a processor creates packets including the source and destination addresses and encapsulates the packets in the format required by its local network. The computer then routes the packets to the appropriate internetworking unit (IWU) for further processing and transmission.

Two significant tasks of IWU's have been identified as the buffering and switching of packets. The buffering task involves reception of packets into the main buffers and transmission of these packets out of the main buffers. The switching task is to determine the destination of the transmission and to modify the formats of the packets as required by the neighboring network protocols.

The buffering and switching, commonly referred to as store-and-forward, are necessary in the packet-switching environment due to network differences such as media speeds, operating protocols, and network traffic.

SUMMARY OF THE INVENTION

One aspect of the present invention provides an internetworking unit (IWU) for receiving and storing packets from a network, processing the packets and forwarding the packets to another network. The IWU includes a packet memory for storing packets and a background buffer controller means coupled to the packet memory for organizing and maintaining the packets in the packet memory. Also included is a foreground buffer controller, where the background controller is coupled between the foreground controller and the packet memory, for transferring packets to and from said background controller. Each of the networks has a network controller and each network controller is coupled to the foreground controller for controlling the transmission of packets from a network to the foreground controller and the reception of packets from the foreground controller to a network.

Another aspect of the present invention provides an internetworking unit (IWU) for receiving and storing packets from one network, processing the packets and forwarding packets to another network. The IWU includes a plurality of packet memories for storing packets and a plurality of background buffer controllers, each coupled to an individual packet memory, for organizing and maintaining packets. Also included is a plurality of foreground buffer controllers. A connection switch is coupled between the plurality of background controllers and the plurality of foreground controllers for transferring packets between any one of the foreground controllers and any one of the background controllers.

BRIEF DESCRIPTION OF THE DRAWINGS

The invention is best understood from the following detailed description when read in connection with the accompanying drawings, in which.

DETAILED DESCRIPTION OF THE INVENTION

I. Overview

The present invention provides an internetworking unit (IU) architecture which makes the storing and forwarding of packets efficient by using various parallelisms among command/data trafficking, packet processing and buffer management. An example of an internetworking unit architecture can be found in pending U.S. Pat. No. 5,367,643 which is herein incorporated by reference.

By using the various parallelisms, the IU provides: 1) high-speed non-blocking data paths, 2) distributed buffer management control for concurrent packet receptions and/or transmissions and 3) separate storages and access paths for packet headers and payloads.

Figure 1:
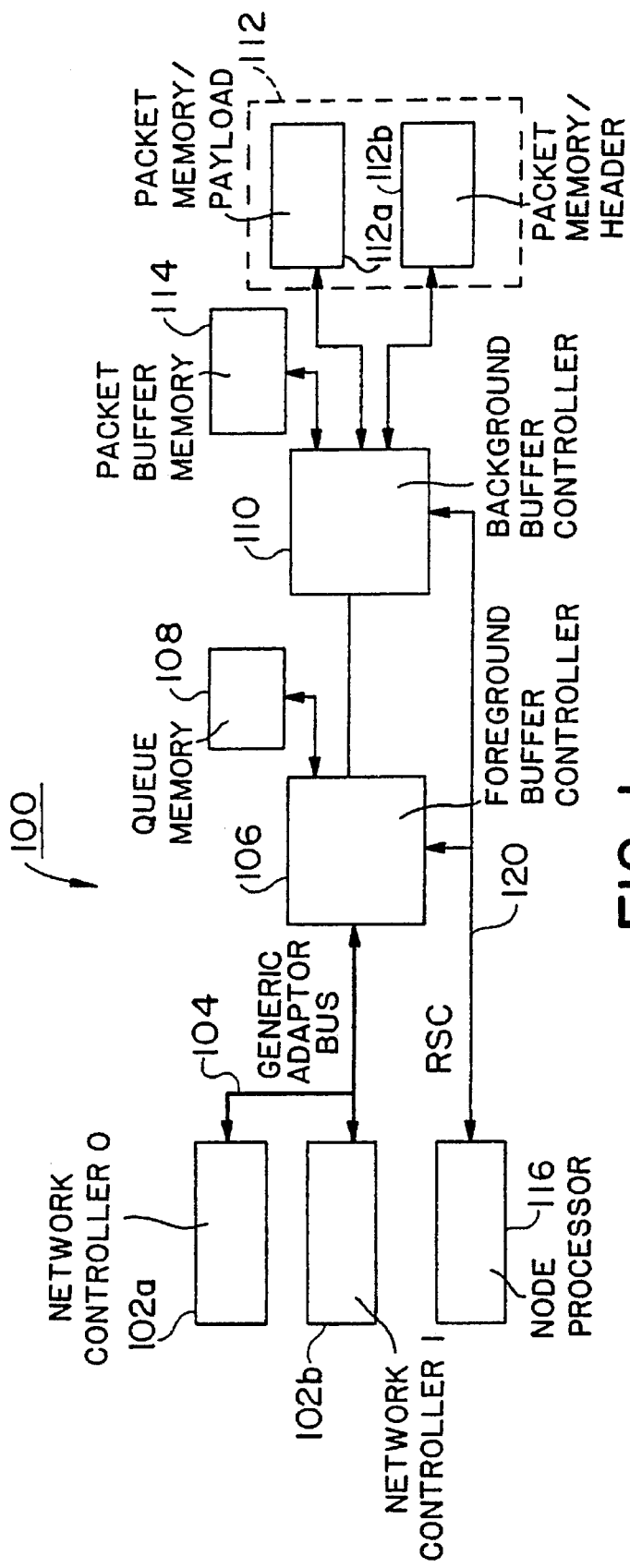
FIG. 1 shows a functional block diagram of a lowend scalable IWU system suitable for use with the present invention.

FIG. 1 shows a lowend scalable internetworking unit (IU) 100 suitable for use with the present invention.

IU 100 includes a plurality of specialized network controllers (NCs) 102a, 102b connected to an adaptor bus (GAB) 104. NCs 102a, 102b provide a specialized interface between a network and IU 100 for sending and receiving packets of data. Each NC 102a, 102b communicates with its respective network using that network's protocol and communicates with other IU 100 processors using GAB 104 protocol.

Foreground buffer controller (FGAM) 106 is also connected to GAB 104. FGAM 106, operating as a frontend buffer control processor, is responsible for interfacing with the NCs using GAB 104 protocol and handling data read/write operations.

FGAM 106 also maintains, in queue memory (QM) 108, queues which indicate the status of received packets (i.e., indicate next packet for processing or next packet for transmitting). However, FGAM 106 has no knowledge regarding where or in what form the packets are stored in packet memory (PM) 112.

It should be noted that creating a front end buffer controller which does not know where or in what form the packets are stored effectively decentralizes the overall control of the buffers. This decentralization of control allows for greater parallel processing of data transfer and control as well as greater scalability.

Connected to FGAM 106 is a background buffer control (BGAM) 110 which maintains the storage of packets in the packet memory (PM) 112. BGAM 110 is responsible for splitting the packet into its respective parts, payload and header; therefore, packet memory 112 is split into two separate memories: PM/p 112a is designated to store the payload information for received packets while PM/h 112b is designated to store the header information for received packets.

BGAM 110, operating as a backend processor, manages a free buffer list indicating which buffers in PM 112 are free as well as an in-use buffer list indicating which linked lists of buffers currently contain packets. The control information associated with the packets and buffers is maintained in packet buffer memory (PBM) 114.

It should be noted, however, that BGAM 110 does not have direct access to GAB 104; thus, the packet movement involving BGAM 110, whether incoming or outgoing, passes through FGAM 106. Thus, the buffer management functions performed by BGAM 110 are isolated from GAB 104.

Connected, via RSC bus 120, to both FGAM 106 and BGAM 110 is a node processor (NP) 116. NP 116, using RSC bus 120, accesses and processes packet header information.

IU 100 provides an architecture which allows data traffic between NCs 102, FGAM 106 and BGAM 110 to occur concurrently with header processing by NP 116 since NP 116 can access packets in PM 112 without tying up GAB 104. Additionally, BGAM 110 can perform memory management functions (e.g., organizing and maintaining buffers) without interfering with GAB 104 activity.

As mentioned above, IU 100 is lowend and scalable. Because the control of the buffers has been decentralized by creating an FGAM and a BGAM separate of one another, efficiently connecting multiple lowend IUs 100 is possible. These interconnections create a highend IU capable of handling more throughput than a lowend IU.

To construct a highend IU, a plurality of lowend IUs 100 are strategically interconnected with a connection matrix (CM) which is briefly described with reference to FIG. 4.

CM 402 strategically and dynamically interconnects FGAMs 106a–n and NPs 116a–n with BGAMs 110a–n to produce a highend IU 400. This configuration (1) allows any FGAM 106a–n to store packets in any PM 112a–n via the corresponding BGAM 110a–n, (2) allows any NP 116a–n to access and process headers maintained by any BGAM 110a–n, and (3) allows any FGAM 106a–n to access the information maintained by any BGAM 110a–n for forwarding purposes.

II. Details of the Exemplary Embodiment

A. Lowend Internetworking Unit (IU) 100

The present invention provides an internetworking unit architecture which makes the storing and forwarding of packets efficient by exploiting various parallelisms among the command/data trafficking, the packet header processing and the buffer managing.

1. Network Controllers (NCs) 102

Referring back to FIG. 1, NCs 102a, 102b provide a specialized interface between a network and IU 100.

Each NC 102a, 102b is capable of communicating with its associated network using that network's protocol while also communicating with FGAM 106 using GAB 104 protocol. Some examples of networks for which a NC 102a, 102b may interface include an FDDI, an Ethernet, a token ring and a microchannel.

Additionally, each NC 102a, 102b contains staging buffers (not shown) which are used to temporarily store data, either incoming or outgoing, in order to resolve potential mismatches between the network media speed and the internal bus speed of IU 100. The staging buffers are small in granularity so that a reception or transmission can be started as soon as possible. In this way, for either a reception or transmission, the latency delay introduced by a NC 102a or 102b between the network port and PM 112 is minimized.

Additionally, each NC 102a, 102b is capable of issuing instructions to FGAM 106 regarding the starting of a reception, allocation of unused buffers, enqueueing of received packets, retrieval of packets for transmission, releasing of buffers after successful packet transmissions and various other queueing status checking operations.

Figure 2:
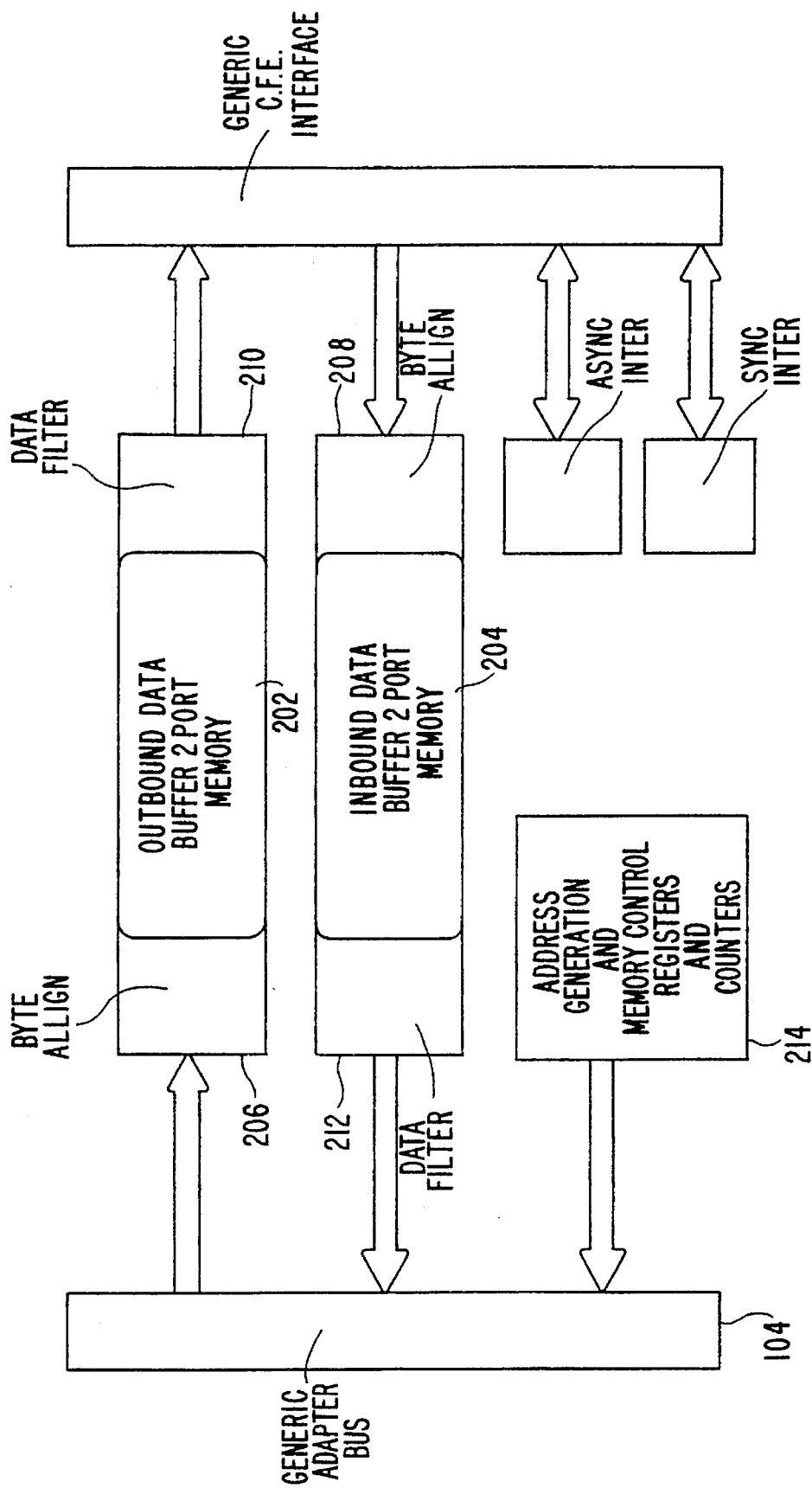
FIG. 2 shows a high-level functional block diagram of a network controller (NC) suitable for use with the present invention.

In the exemplary embodiment of the present invention, NCs 102a, 102b are implemented with an architecture as shown in FIG. 2.

Two dual-ported memories 202, 204 provide the elasticity and staging buffers for the packet data flowing to and from an FGAM (shown in FIG. 2). Each of the data buffers has byte alignment logic 206, 208 at its input. The potential for specialized data filters 210, 212 exists on the output of either or both of the data buffers.

The byte alignment logic 206 on the input of the outbound data buffer allows the transfer of packets which are aligned on arbitrary bytes in the PM (shown in FIG. 2). The byte alignment logic 208 on the input of the inbound data buffer allows for arbitrary alignment of bytes within words either from the network interface, or from a local bus interface.

The registers and counters, functional block 214, are used to generate addresses to the PM, and construct and field FGAM requests.

2. Generic Adaptor Bus (GAB) 104

Figure 4:
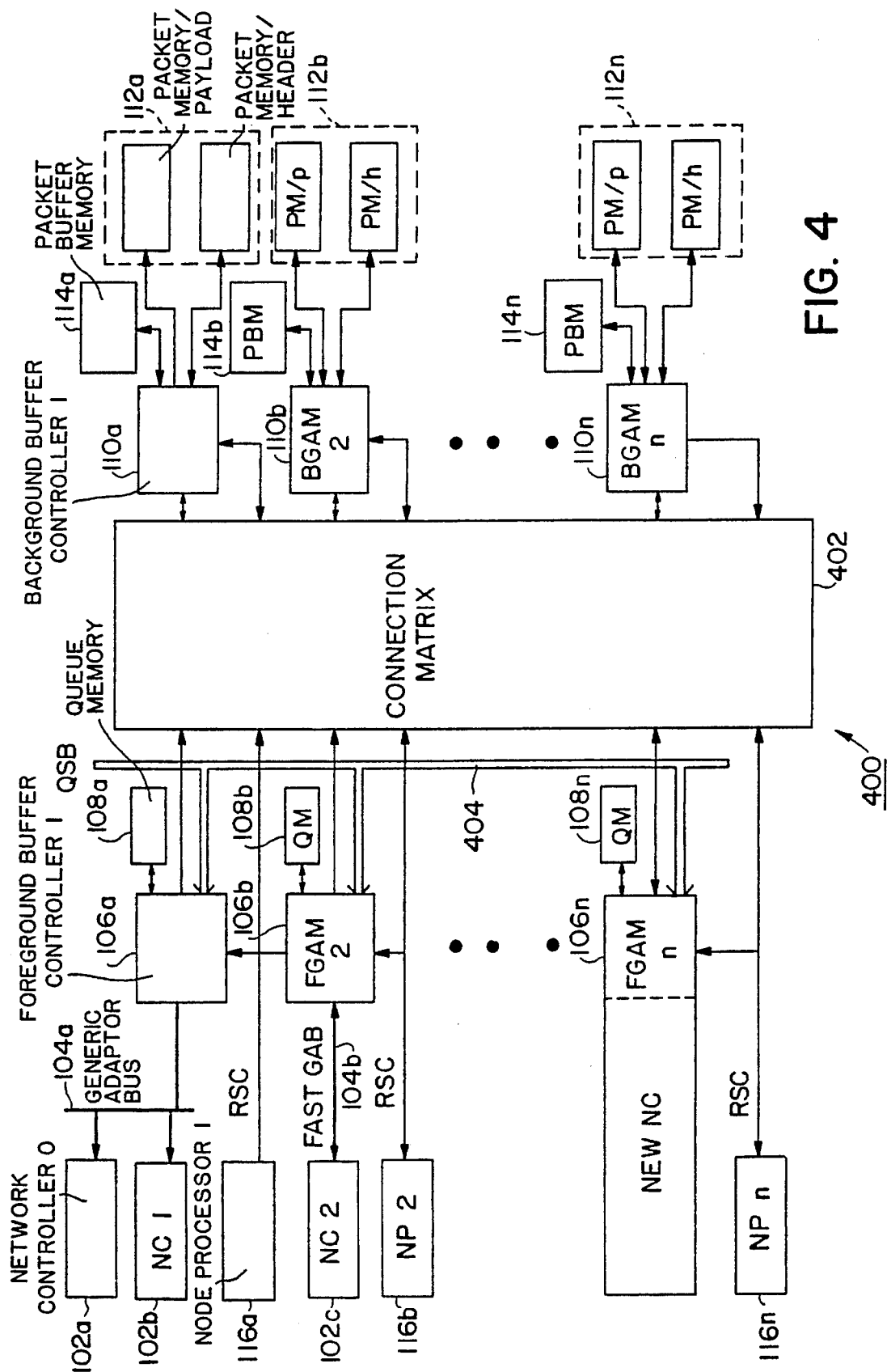
FIG. 4 shows a functional block diagram of a highend IU system employing a plurality of the lowend IUs of FIG. 1.

Referring to FIG. 4, GAB 104a and GAB 104b are the busses on which NCs 102a–n and FGAMs 106a–n communicate. In the exemplary embodiment of the present invention, IU 400 is capable of supporting multiple GABs 104a, 104b each having different speeds. GAB 104a is designed to operate with an 80 ns cycle while fast GAB 104b is designed to operate at a 40 ns cycle. This capability is provided by way of FGAMs which can operate at either speed in order to be compatible with existing NCs as well as new NCs designed with new technologies.

3. Foreground Buffer Control (FGAM) 106

Referring to FIGS. 2 and 4, FGAM 106, as a frontend processor, is responsible for interfacing with NCs 102 using GAB 104 protocol and handling data read/write operations.

FGAM 106 also maintains the incoming and outgoing queues, and keeps the queueing information (or queue table entries [QTEs]) in the form of linked lists for the packets in queue memory (QM) 108.

Figure 5:
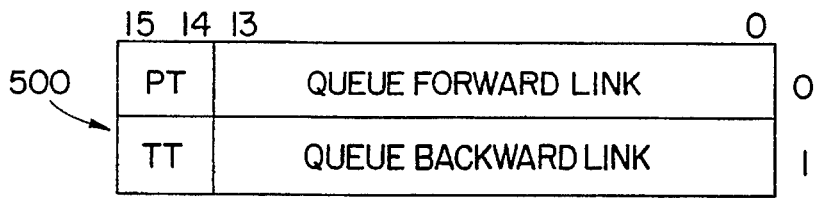
FIG. 5 shows a format of a queue table entry (QTE) suitable for use in the systems of FIGS. 1 and 4.

FIG. 5 shows the format of a QTE. A QTE comprises two sixteen bit words. For word 0, bits 15-14 indicate the packet type while bits 13-0 indicate the forward link. For word 1, bits 15-14 indicate traffic type while bits 13-0 indicate the backward link. A QTE contains no packet retrieval information, thus, when an FGAM is communicating with a BGAM, it uses the QTE ID.

4. Queue Memory (OM) 108

Associated with each FGAM 106 is a queue memory (QM) 108. QM 108 is used to store the QTEs as described above.

5. Background Buffer Control (BGAM) 110

BGAM 110 is connected to FGAM 106. BGAM 110, functioning as a backend processor, manages the free buffer list and the stored packets as linked lists of buffers.

The control information about packets (packet table entries [PTEs]) and buffers (buffer table entries [BTEs]) is maintained in PBM 114.

Figure 6A:
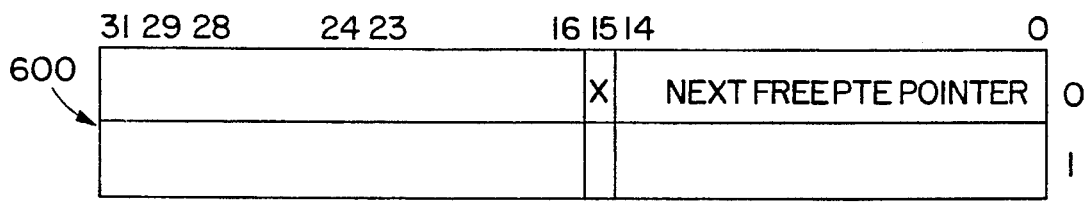
FIGS. 6(a) and 6(b) show the format of a packet table entry (PTE) suitable for use in the systems of FIGS. 1 and 4.
Figure 6B:
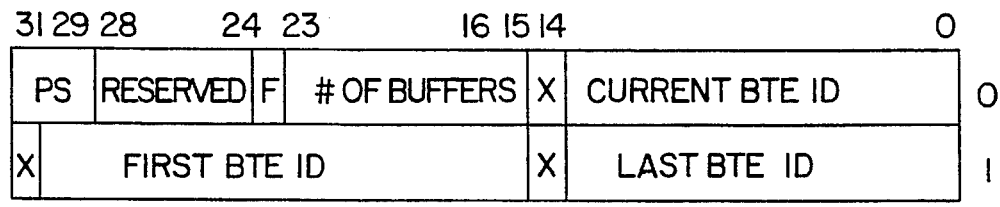

FIGS. 6a and 6b show the format of a PTE in the free list and in use, respectively. FIG. 6a shows two 32-bit words. In word 0, bits 14-0 indicate the next free PTE pointer while the remaining bits of word 0 and word 1 are unused.

FIG. 6b also shows two 32-bit words. In word 0, bits 31-29 indicate the packet state, bits 28-24 are reserved, bit 24 indicates if this PTE is for the first buffer in the group of buffers storing the packet, bits 23-16 indicate the number of buffers used to store the packet and bits 14-0 indicate the current BTE ID. In word 1, bits 30-16 indicate the ID of the first BTE for this packet and bits 14-0 indicate the ID of the last BTE for this packet.

Figure 7:
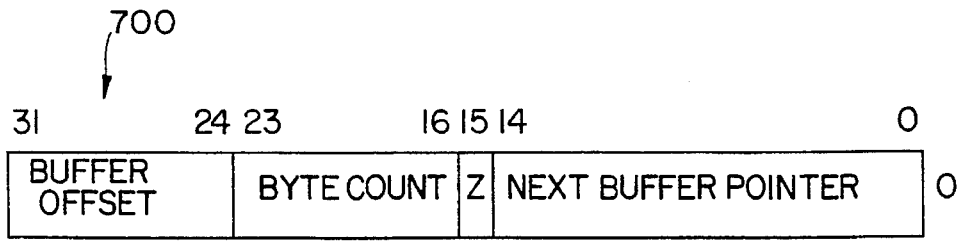
FIG. 7 shows the format of a buffer table entry (BTE) suitable for use in the systems of FIGS. 1 and 4.

FIG. 7 shows the format of a BTE. Each BTE is a 32-bit word wherein bits 31-24 indicate the buffer offset, bits 23-16 indicate the byte count, bit 15 indicates the zero byte buffer and bits 14-0 indicate the next buffer pointer.

Figure 8:
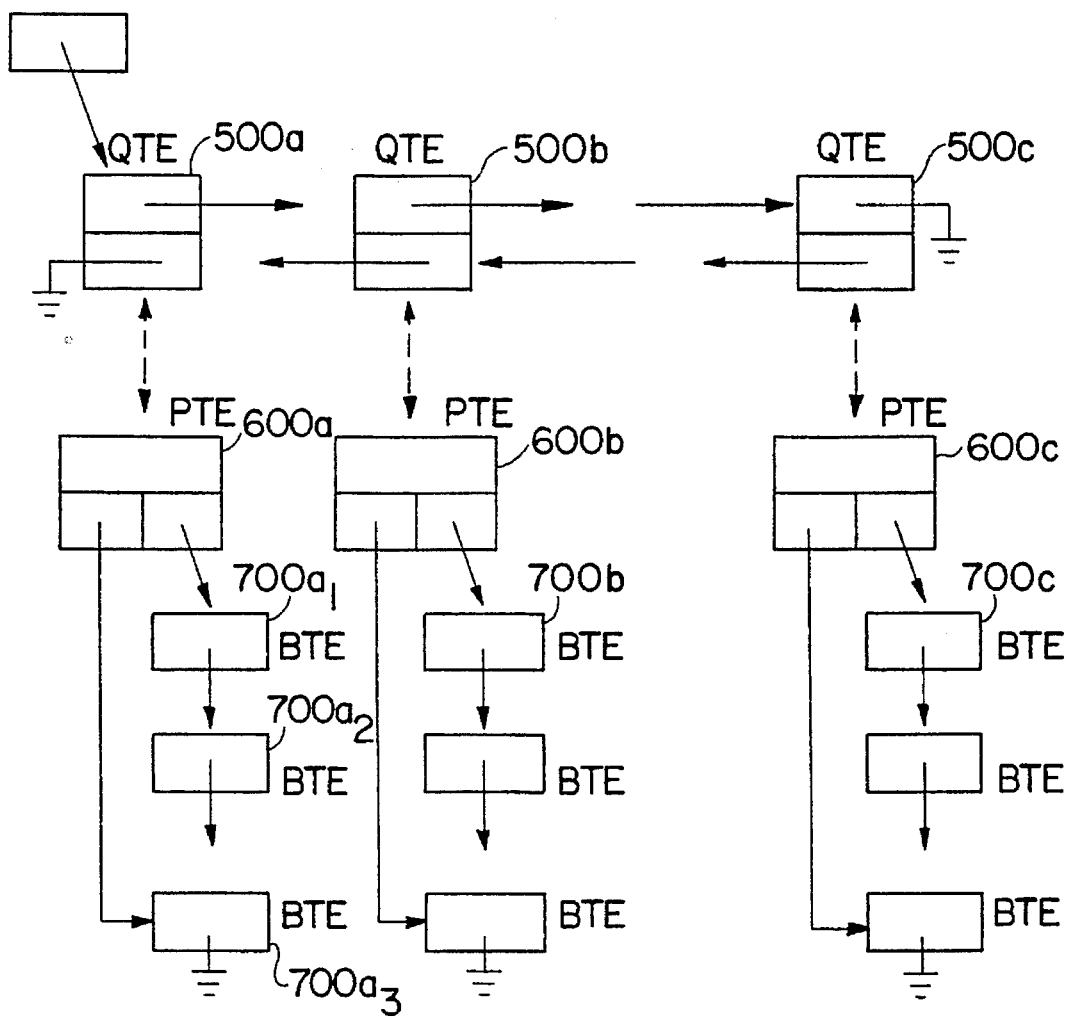
FIG. 8 schematically represents the relationship between QTEs, PTEs and BTEs as shown in FIGS. 5, 6 and 7, respectively.

FIG. 8 is a schematic representation of the relationships between the QTEs, the PTEs and the BTEs. As seen in FIG. 8, word 0 of QTE 500a points to QTE 500b which points to QTE 500c, while word 1 of QTE 500c points to QTE 500b which points to QTE 500a.

Each QTE maps directly to a PTE. For example, QTE 500a maps directly to PTE 600a, and word 1 of PTE 600a contains the pointers to the first BTE 700a$_1$ and the last BTE 700a$_3$.

The following example is described with reference to FIG. 2 to illustrate the operation of the overall data structure and its relationships. When NC 102a wants to transmit a packet, it issues a Request-Reception (RRx) primitive to FGAM 106. FGAM 106 responds to NC 102a with a QTE ID which is a pseudo-buffer pointer. Although NC 102a interprets the QTE ID as the starting address of some buffer in a psuedo-PM, the data from NC 102a is written into FGAM 106.

To obtain the QTE ID, FGAM 106 informs BGAM 110 of the start of a packet reception which, in turn, allocates a free PTE and an initial BTE. Since the BTE ID is directly mapped to the starting address of the buffer space, BGAM 110 is ready to accept packet data. The PTE ID is then returned to FGAM 106 as the response from BGAM 110. FGAM 106 then uses the PTE ID to allocate the needed QTE (if in a highend IWU, a BGAM ID is also necessary). Once FGAM 106 receives data from NC 102a on GAB 104, FGAM gives the QTE ID to BGAM 110 in order to enable BGAM 110 to keep the proper context.

Every time a data movement is started, FGAM 106 also uses the offset provided by NC 102a to inform BGAM 110 of the point at which to resume the data transfer. Note that BGAM 110 desirably keeps track of the current buffer (BTE) that the offset is related to. If more buffers are needed as the reception proceeds, NC 102a issues Request-Buffer (RB) primitives to get more buffers. But, FGAM 106 always responds with the same QTE ID as pseudo buffer pointers. That is, FGAM 106 does not keep track of the progress of the data transfer. BGAM 110 automatically allocates more free BTEs whenever it detects a zero offset passed from FGAM 106.

Because all packet data movement is serviced by BGAM 110 through a connection-oriented protocol, there is no need for an address bus between BGAM 110 and FGAM 106.

6. Packet Memory (PM) 112

Associated with each BGAM 110 is a packet memory (PM) 112. PM 112 is split into two memories: PM/p 112a for storing the payload of a packet and PM/h 112b for storing the header of a packet.

PM/p 112a is organized as buffers of memory. In the exemplary embodiment, each buffer is 256 consecutive bytes. Likewise, PM/h 112b is organized as buffers of memory, and each of its buffers is 32 consecutive bytes.

7. Packet Buffer Memory (PBM) 114

Also associated with each BGAM 110 is a packet buffer memory (PBM) 114. PBM 114 is used to store the PTEs and BTEs as described above.

8. Node Processor (NP) 116

NP 116 is connected to both FGAM 106 and BGAM 110 via RSC bus. NP 116 processes packet headers which have been received and stored in PM/h 112b.

Figure 3:
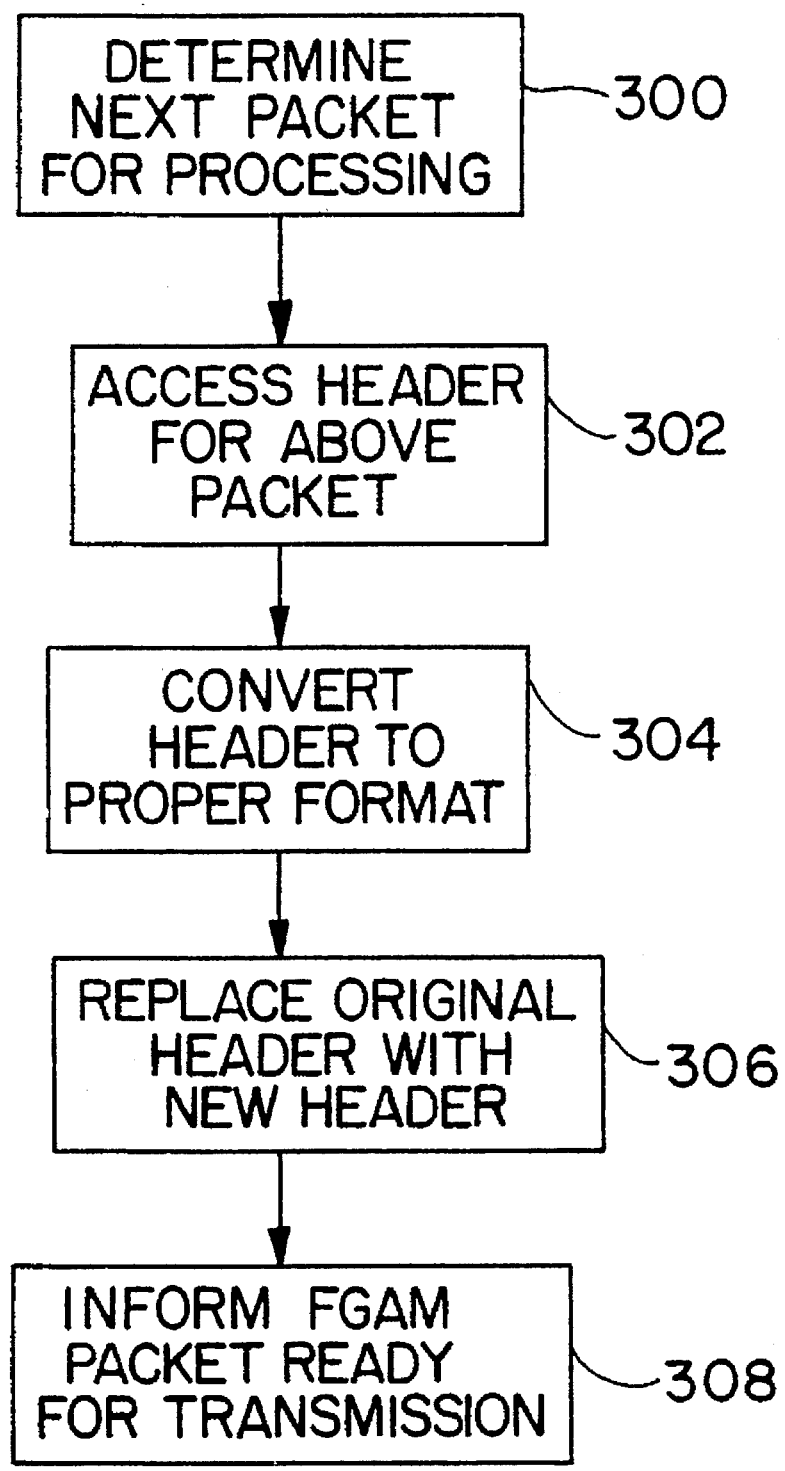
FIG. 3 shows a flowchart illustrating the processing steps of a node processor suitable for use in the IU of FIG. 1.

Referring back to the flowchart of FIG. 3, the processing steps basically include communicating with FGAM 106 to determine which packet is next to be processed, step 300. NP 116 communicates, via RSC bus 120, with FGAM 106 in order to access its processor queue which contains the ID of the next packet to be processed.

Once NP 116 knows which packet is next, NP 116 accesses the header for that packet through BGAM 110 which controls buffer management, step 302. Using the packet ID, NP 116 makes a request, via RSC 120, to BGAM 110 to retrieve the corresponding header from PM/h 112b.

Next, NP 116 transforms the original header into a header compatible with the network for which the packet is destined, step 304. It should be noted that the extent of NP 116 conversion capabilities is application dependent. As described below in the Applications section, whether an NP 116 converts formats at the data link layer, the network layer or both depends on the type of networks that IU 400 interconnects.

NP 116 replaces the original header with the new header for that packet via BGAM 110, step 306. After processing, NP 116 then makes another request, via RSC bus 120, to BGAM 110 to replace the original header in PM/h 112b with the new converted header.

Finally, NP 116 makes a request, via RSC 120, to FGAM 106 in order to enqueue that particular packet. In other words, NP 116 informs FGAM 106 that this particular packet is ready to be transmitted, step 308.

Because NP 116 performs translations from one known network format to another known network format, an implementation of NP 116 is well known to those skilled in the art. Detailed discussions of network architecture layers and associated protocols are found in G. E. Keiser, *Local Area Networks*, 1989 McGraw-Hill, and R. J. Cypser, *Communications for Cooperating Systems*, 1991 Addison-Wesley which are both herein incorporated by reference.

B. Highend IU 400

Referring back to FIG. 4, to construct a highend IU, a plurality of lowend IUs 100 are strategically interconnected with a connection matrix (CM) 402.

CM 402 strategically and dynamically interconnects FGAMs 106a–n and NPs 116a–n with BGAMs 110a–n to produce a highend IU 400. Having the basic buffer controller responsibilities divided into an FGAM 106a and a BGAM 110a is particularly advantageous for a highend IU because it permits a configuration which, in parallel, (1) allows any FGAM 106a–n to store packets in any PM 112a–n via the corresponding BGAM 110a–n, (2) allows any NP 116a–n to access and process the headers maintained by any BGAM 110a–n, and (3) allows any FGAM 106 to access the information maintained by any BGAM 110a–n for forwarding purposes.

1. Connection Matrix (CM) 402

CM 402 and its operation are explained by way of an example.

When a Request Reception command (RRx) is received by FGAM i, it then makes a connection request to CM 402 for an arbitrary BGAM which is not assigned to any FGAM at that time. In this case, assume that CM 402 forwards the connection request and the RRx command to BGAM j. A connection is established when BGAM j grants the connection request. CM 402 holds the connection until FGAM i drops the request. Before storing the packet, BGAM j responds to the request of FGAM i with the number j along with the PTE ID so that the packet can be located later.

CM 402 also accepts requests from FGAMs 106a–n to connect to a specific BGAM when doing transmission and header processing. When there are multiple FGAMs 106a–n waiting for the same BGAM 110a, a prioritized scheme can be implemented in which the more recent or less important user of a specific BGAM 110a has a lower priority.

Figure 9:
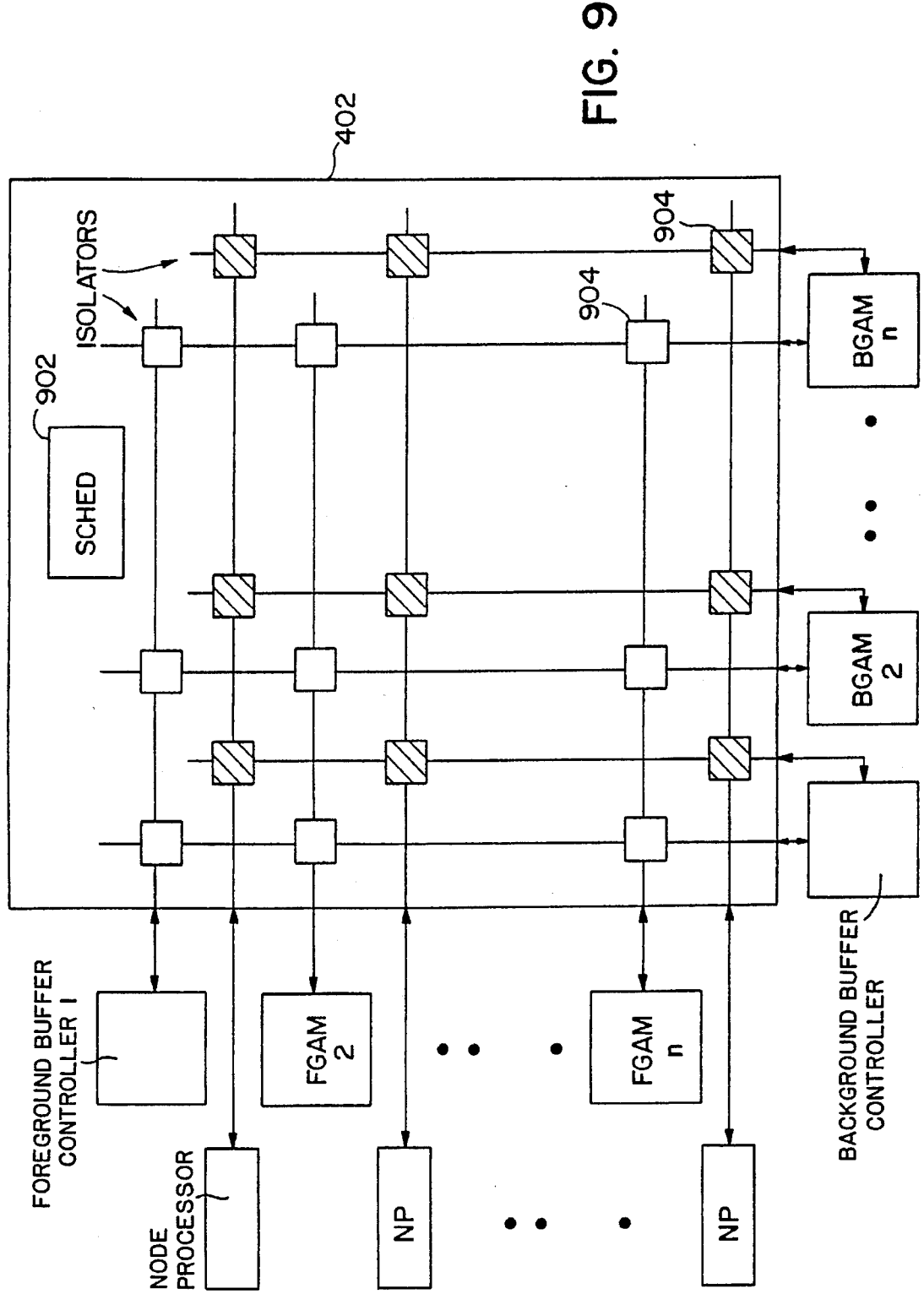
FIG. 9 shows the details of the connection matrix of FIG. 4.

FIG. 9 shows a functional block diagram of CM 402. The matching policy is implemented by a centralized scheduler (SCHED) 902. Collecting the requests from FGAMs 106a–n (NPs 116a–n) and status information from BGAMs 110a–n, SCHED 902 generates signals to control isolators 904 individually. There cannot be two FGAMs 106a–n or two NPs 116 accessing the same BGAM 110a–n. An FGAM 106a–n should have no problem getting a buffer from a free BGAM 110a–n as long as there are as many BGAMs 110a–n as FGAMs 106a–n.

2. Queueing and Service Bus (QSB) 404

Referring back to FIG. 4, the above description of CM 402 presents a scheme for how a receiving FGAM 106a–n stores packets into a PM 112a–n. However, an FGAM 106a–n can forward packet retrieval information to another FGAM 106 which is to handle a transmission by way of a queueing and service bus (QSB) 404.

For example, once the destination of a packet is known by an FGAM 106a, with help from the associated NP 116a, FGAM 106a then uses QSB 104 to broadcast both the packet destination and retrieval information. All FGAMs 106b–n are required to listen in while others are broadcasting. Only the FGAM 106b–n which is to handle the transmission takes the packet retrieval information from the bus and attaches it to the respective outgoing queue. QSB 404 is also useful for other types of FGAM coordinations during the initialization.

III. Operation

A. Primitives

The following is a list of primitives which define functionality and interactions among FGAMs 106a–n, BGAMs 110a–n and CM 402. The primitives are explained in the context of actions performed by an FGAM 106 in conjunction with a connected BGAM 110. CM 402, once connections are requested and granted via SCHED 902, is considered transparent between FGAM 106 and BGAM 110.

Accept: Each FGAM is assigned a set of queues at system initialization. These queues are associated with NPs or PMIs.

Create: An FGAM issues this primitive upon receiving requests from PMIs to receive or create packets. The FGAM sends a connection request to the SCHED and sends the primitive through CM. The connected BGAM responds with its ID and a free packet ID number (PID). The FGAM records the (BGAM ID, packet ID) pair that uniquely identifies a QTE in QM. The BGAM allocates a PTE from the head of the free PTE pool. The allocated PTE is set to be a single buffer packet. The BGAM then appends this PTE ID after its own ID to form the unique QTE ID and responses to the FGAM. The BGAM also pre-allocates a free BTE from the free BTE pool.

Write: The FGAM issues this primitive when transferring packet data into the PM. It is done by first requesting, for connection, the BGAM specified by the QTE ID of the packet. Once connected, the PID is sent to the BGAM followed by the packet data. Following the initial primitive, packet data is streamed to the BGAM one word per cycle. After receiving this primitive, the BGAM uses the PID to retrieve the PTE and writes the data into the PM. A counter is used to accumulate the number of bytes of data received. When the current buffer is filled up to some threshold, a new buffer is allocated from the free BTE pool. Once a new buffer is used, the following operations are performed on the PTE:

(1) update the last BTE ID of the PTE to reflect packet growth;

(2) increment the number of buffers of PTE by one;

(3) record the byte count and offset of the previous finished buffer; and (4) increase the packet length by the value of the counter register and reset the counter to zero.

The write primitive can be issued any number of times during packet generation depending on the scheduling of the FGAM-BGAM connections. The current pointer is updated only when the data streaming stops. Also, the packet length is updated by the counter value. Note that the counter is not used if the packet is not in the packet generation stage.

Open: The FGAM issues this primitive to service the packet at the head of the queue. According to the QTE ID of the packet, the FGAM asks for connection to the specified BGAM, and passes the request to "open a packet" to the BGAM. When the BGAM receives this primitive, it retrieves the PTE of the packet. It then resets the current pointer to the beginning of the packet to prepare for the ensuing read primitives. PS is also modified if necessary to reflect the packet's new status.

Read: The FGAM issues this primitive when reading packet data. The remaining packet length of the specified packet is expected from the BGAM before any data. Upon encountering an end-of-packet indicator, the FGAM stops reading and drops the connection request. After receiving this primitive, the BGAM uses the received PID to retrieve the PTE and obtain the current pointer for data being read from the PM. The BGAM first calculates the remaining packet length according to the first BTE ID, last BTE ID and current pointer. The remaining length is returned to the FGAM as the first response. The BGAM then begins to supply data words one cycle at a time. Before the current buffer is exhausted, the next buffer is located by tracing down the BTE chain. The current pointer points to the next data to be read. Similar to the write primitive, the read primitive is usually issued more than once during a packet consumption period.

Purge: Due to some exception conditions, such as a PMI being overrun by the incoming data from the medium, packets under generation or processing may be dropped. A connection request is issued according to the QTE ID to the intended BGAM. Upon receiving this primitive, the BGAM frees the specified PTE to the free PTE pool and returns all the allocated BTE's to the free BTE pool.

Close: When a FGAM is done with a packet, the FGAM queues the packet to a NP or NC. If the specified queue is local to the FGAM, it links the QTE into the double linked list of the local queue. Otherwise, the FGAM requests the ownership of the QSB-Bus. Once granted, the FGAM broadcasts the destination queue ID followed by the QTE ID on the bus. All FGAMs are constantly monitoring the QSB-Bus. If the broadcast queue is found local, the QTE ID is copied and linked in the specified queue. No BGAMs are involved.

Erase: This primitive has two types, delete from the packet head or tail. Packet data is deleted from the head if the packet header has shrunken, and from the tail if data is to be removed, for example, a frame check sequence (FCS). It should be noted that the FCS is usually stripped off by the NC. According to the received PID, the packet length is decreased by the given number of bytes. BTE is updated to reflect the result of this reduction. The first BTE ID or the last BTE ID are changed if this reduction causes an empty buffer.

Lseek: An FGAM issues this primitive to set the current pointer of the PTE in the BGAM to an offset relative to the current current pointer position. It should be noted that both positive and negative offsets are allowed. According to the QTE ID, FGAM requests a connection to the BGAM overseeing the packet. Once granted, offset value and type are sent to BGAM. BGAM updates the current pointer value of the packet by adding the offset to current pointer. If the resulting current pointer is negative, this primitive adds extra buffers in the beginning of the BTE chain. Note that this primitive only increases the packet space. Valid data can be filled by issuing the write primitives.

B. Example

Figure 10:
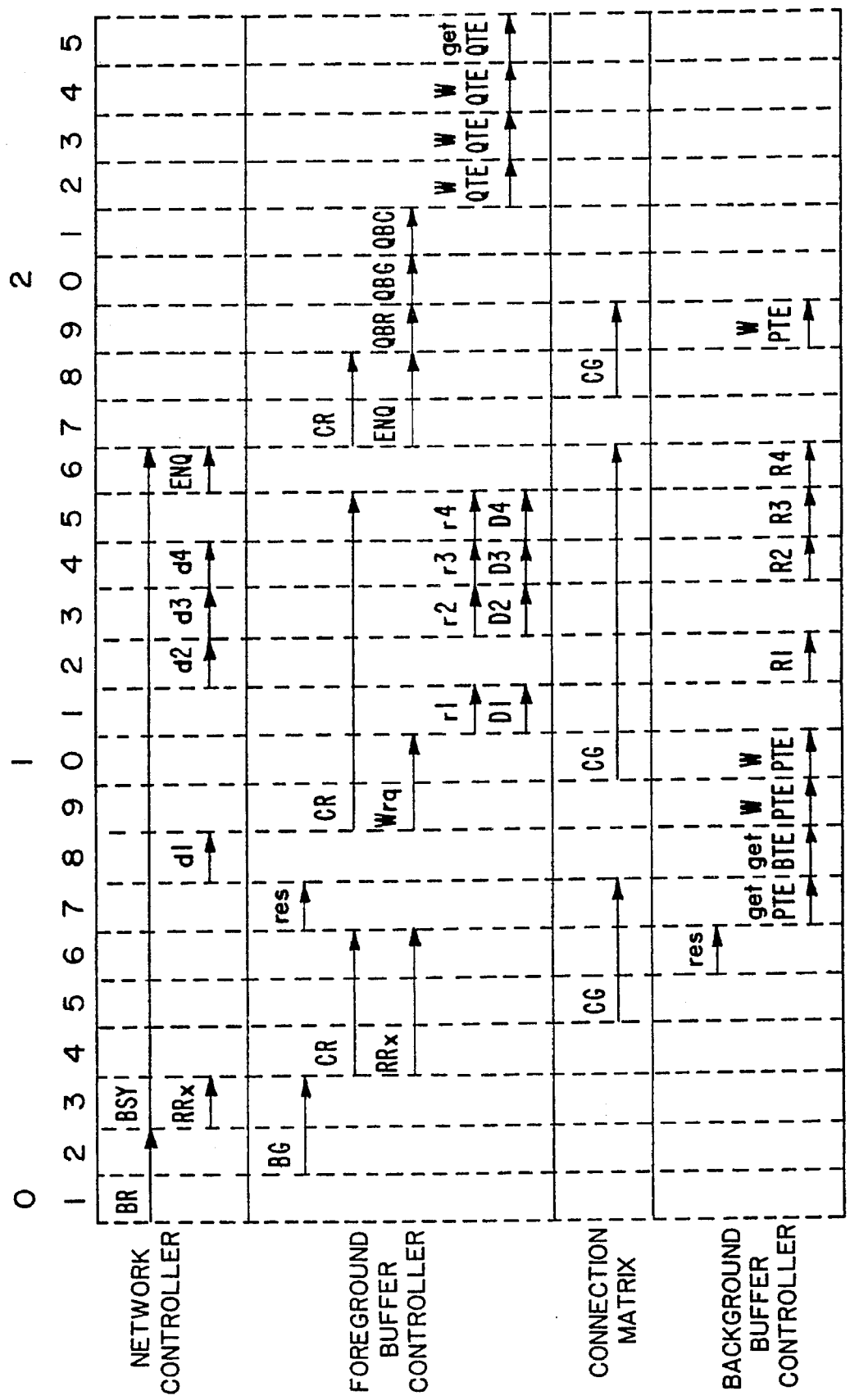
FIG. 10 shows an example of the timing of an operation of the highend IU of FIG. 4.

FIG. 10 shows the steps, in machine cycles, of a reception of a 16-byte packet from a NC in order to illustrate, by example, the interactions among the functional components of highend IU 400.

First, the NC starts with a GAB bus request (BR) signal and waits for the bus grant (BG) signal from the FGAM. Once the BG is detected, the NC holds the bus ownership in the next cycle by activating the bus busy (BSY) signal, and gives out a RRx signal. After the detection of the RRx, the FGAM issues a connection request (CR) signal to the CM asking for a free BGAM, and forwards the RRx. The connection establishment is indicated to the FGAM by a connection grant (CG) signal. At the same time, the RRx signal is forwarded to the BGAM. The response (res), which consists of the BGAM ID and a packet ID, is then propagated back to the FGAM and the NC in two cycles. After the response is generated, the BGAM begins some house keeping work, such as preparing the next PTE and BTE, and recording the first two words of the PTE information.

When the response returns to the NC, the NC writes the first 4-byte word (dl) to the FGAM. The FGAM then issues a CR signal and a write request (Wrq) signals to the CM. The Wrq signal is then forwarded to the BGAM at the same time the CG signal is generated from the CM to the FGAM. After the FGAM detects the CG signal, a response (rl) is sent back to the PMI, and the data word is forwarded to the BGAM. The data words and responses between the FGAM and the BGAM are denoted by D#'s and R#'s, respectively.

Finally, the NC issues an enqueue (ENQ) signal, which will be propagated to the BGAM, causing the last piece of the PTE information to be recorded. The FGAM in the propagation path activates the QSB bus request (QBR) signal after the confirming CG signal from the CM. After the FGAM gets the QSB grant (QBG) signal, it then issues a queueing control (QBC) signal, which contains the address of the packet and the address of the transmission queue. All FGAM's listen to the QBC signal, and the one which manages the transmission queue takes the information from the bus to enqueue the packet in QTE format. The operation is complete by preparing a free QTE and the FGAM is ready for the next enqueue operation.

C. Applications

Referring to FIG. 4, IU 400 can be used differently in different applications.

For example, IU 400 can be used as a router. If IU 400 is employed as a network router between two fiber distributed data interfaces (FDDIs) with a common network layer protocol, because the formats do not differ, an NP 116 need only modify the destination address in the packet header before the packet is forwarded.

Another example is IU 400 used as a gateway. An IU 400 can be employed as a gateway between an FDDI network using TCP/IP and an Ethernet network using XNS/IDP. In this case, the formats differ up to and including the network layer. In Operation, an Ethernet frame arrives at its associated NC, the Ethernet frame encapsulation format is stripped off by the NC and the data packet is stored in an IDP format. Next, an NP 116 converts the format of the packet from IDP to TCP/IP with appropriate modifications to the destination address. Finally, the TCP/IP packet is forwarded to its destination, where the intermediate NC encapsulates it in an FDDI format.

In the above examples, the NCs are designed to strip off encapsulating formats or add encapsulating formats associated with the data link layer for data coming into an IU or out of an IU, respectively. However, these stripping and adding functions can be implemented in an NP such that the NP does a format conversion for each of the various layers (e.g., data link, network, transport).

IV. Performance

Tests with the present architecture have been conducted using Fiber Distributed Data Interface (FDDI) networks as the target attachments.

Various combinations of average packet interarrival times and packet data lengths of exponential distribution are used to generate network traffic. The throughput is measured by aggregate packet receptions from all NCs to determine the performance of the architecture.

Figure 11:
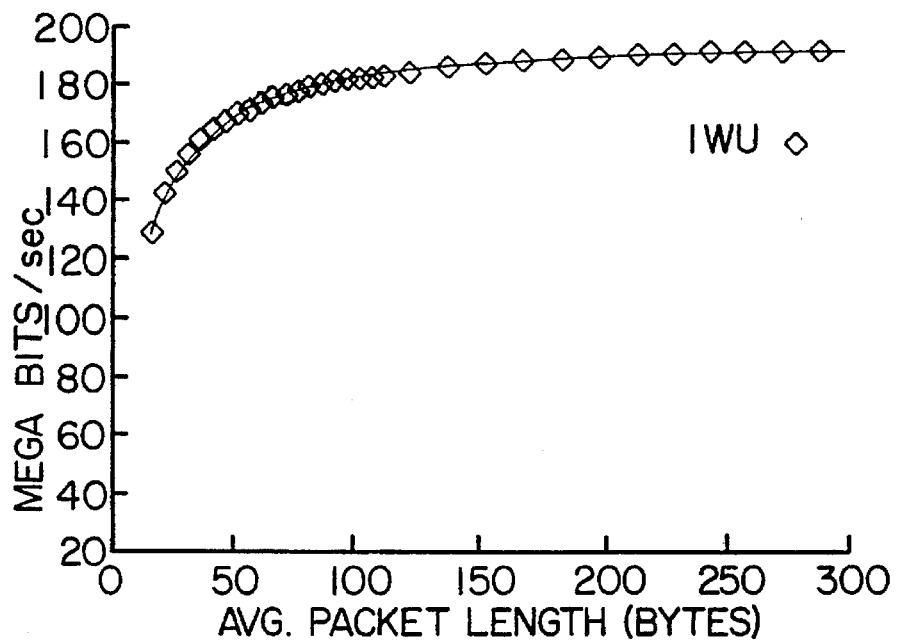
FIG. 11 shows the throughput of the IU of FIG. 4 in Mega bits per second (Mbps) with 2 Fiber Distributed Data Interfaces (FDDIs)
Figure 12:
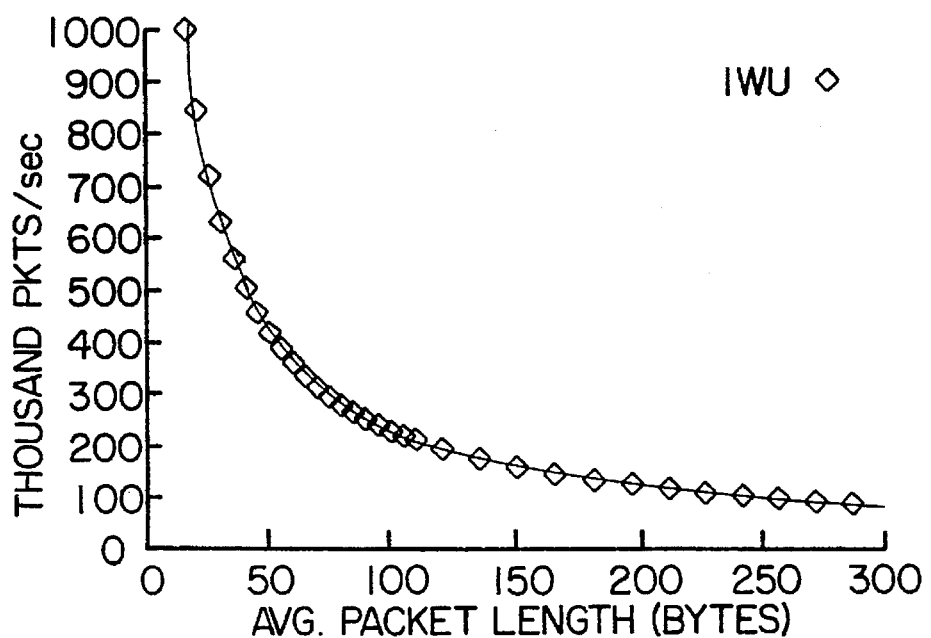
FIG. 12 shows the throughput of the IU of FIG. 4 in Kilo packets per second (Kpps) analysis with 2 FDDIs.

FIGS. 11 and 12 show the aggregate throughput in units of Mbps (megabits per second) and Kpps (thousand packets per second) for an IU. The results indicate that the IU is capable of handling all FDDI traffic types without being a bottleneck.

Although the invention is illustrated and described herein embodied as a parallel scalable internetworking unit architecture, the invention is nevertheless not intended to be limited to the details as shown. Rather, various modifications may be made in the details within the scope and range of equivalents of the claims and without departing from the spirit of the invention.

What is claimed:

1. In a system having a plurality of networks communicating with packets, a parallel, scalable inter-networking packet routing apparatus for receiving and storing packets from one of the plurality of networks, processing the packets and forwarding packets to another one of the plurality of networks comprising:

a plurality of first control means each first control means for receiving packets from anyone of the plurality of networks, for maintaining a queuing status of the received packets and transferring packets;

a plurality of packet memory means for storing packets received and transferred by the plurality of first control means;

a plurality of second control means, separate from the plurality of first control means, each second control means coupled to an individual one of said plurality of packet memory means, for receiving the transferred packets from a first control means, and for organizing and maintaining packets in respective packet memory means, the plurality of second control means operate concurrently with and independently from the plurality of first control means;

connection switch means, coupled between the plurality of first control means and the plurality of second control means, for transfering packets between any one of the plurality of first control means and any one of the plurality of second control means; and a plurality of node processor means coupled to a respective first control means and said connection switch means, each node processor means for 1) obtaining status of the stored packets from the respective first control means, 2) accessing packets from a packet memory means by way of the connection switch means and a second control means, 3) processing packets based on their origin and destination, 4) storing the processed packets back into the packet memory means by way of the connection switch means and the second control means and 5) for updating the queueing status of the packets by way of the respective first control means, the plurality of node processors operate concurrently with and independently from the first and second control means.

2. The inter-networking packet routing apparatus of claim 1 further providing each of said plurality of networks having a network controller means, each network controller means coupled to one of said plurality of first control means, each of said network controller means for controlling the transmission of packets from its respective network to said first control means and the reception of packets from said first control means to its respective network.

3. The inter-networking packet routing apparatus of claim 1 further providing a plurality of queue memories, each coupled to one of said plurality of first cotrol means and containing a queuing status in the form of queue table entries (QTEs) indicating which packets are ready to be processed by a respective node processor means and which packets are ready to be transferred from a respective packet memory means to one of said plurality of network controller means.

4. The inter-networking packet routing apparatus of claim 3 wherein providing a plurality of packet buffer memories which are used in the maintenance and organization of said packets, each coupled to one of said plurality of second control means and containing packet table entries (PTEs) and buffer table entries (BTEs), each PTE points to a linked list of BTEs which correspond to a plurality of locations in a respective packet memory means containing the packet identified by a QTE.

5. The inter-networking packet routing apparatus of claim 1 wherein said packets comprise a payload and a header, each of said packet memory means comprises first and second memories, wherein said first memory contains packet payloads and said second memory contains packet headers.

6. The inter-networking packet routing apparatus of claim 1, wherein packets are received from one of said plurality of networks and packets are sent to another of said plurality of networks, wherein all of said first control means are coupled via a communication bus.

7. In a system having a plurality of networks communicating with packets, a parallel, scalable inter-networking packet routing apparatus for receiving and storing packets from one of the plurality of networks, processing the packets and forwarding the packets to another of the plurality of networks comprising:

first control means for receiving packets from one of said plurality of networks, for maintaining a queuing status of the received packets and transferring the packets, packet memory means for storing packets received and transferred by the first control means;

second control means, separate from the first control means and coupled between the first control means and the packet memory means, for receiving the transferred packets from the first control means, and for organizing and maintaining the packets in the packet memory means, the second control means operates concurrently with and independently from the first control means;

node processor means, separate from the first and second control means and coupled to both the first and the second control means for 1) obtaining status of the stored packets from the first control means, 2) accessing packets from the packet memory means by request to the second control means, 3) processing packets based on their origin and destination, 4) storing the processed packets back into the packet memory means by way of the second control means and 5) for updating the queueing status of the packets by way of the first control means, the node processor operates concurrently with and independently from the first and second control means, thereby the first control means, second control means and the node processor means being separated and decentralized of control to provide for parallel operation and scalability.

8. The inter-networking packet routing apparatus of claim 7, wherein said node processor means is directly coupled to said second control means and said first control means.

9. The inter-networking packet routing apparatus of claim 7 further providing each of said plurality of networks having network controller means, each network controller means coupled to said first control means for controlling the transmission of packets from one of said plurality of networks to said first control means and the reception of packets from said first control means to one of said plurality of networks.

10. The inter-networking packet routing apparatus of claim 7 further providing a queue memory coupled to said first control means, said queue memory containing queuing status in the form of queue table entries (QTEs) indicating which packets are ready to be processed by said node processor means and which packets are ready to be transferred from said packet memory means to one of said plurality of network controller means.

11. The inter-networking packet routing apparatus of claim 10 further providing a packet buffer memory coupled to said second control means which is used in the maintenance and organization of said packets, said packet buffer memory containing packet table entries (PTEs) and buffer table entries (BTEs), each PTE points to a linked list of BTEs which correspond to a plurality of locations in the packet memory means containing the packet identified by a QTE.

12. The inter-networking packet routing apparatus of claim 7, wherein said packets comprise a payload and a header, said packet memory means comprises first and second memories, said first memory contains packet payloads and said second memory contains packet headers.

* * * * *